US008206029B2

(12) United States Patent
Vaucher et al.

(10) Patent No.: US 8,206,029 B2
(45) Date of Patent: Jun. 26, 2012

(54) MICRO-MECHANICAL PART WITH A SHAPED APERTURE FOR ASSEMBLY ON A SHAFT

(75) Inventors: Frédéric Vaucher, La Chaux-de-Fonds (CH); Raymond Gabus, Le Locle (CH); Marco Verardo, Les Bois (CH)

(73) Assignee: Nivarox-FAR S.A., Le Locle (CH)

( * ) Notice: Subject to any disclaimer, the term of this patent is extended or adjusted under 35 U.S.C. 154(b) by 838 days.

(21) Appl. No.: 12/280,836

(22) PCT Filed: Feb. 23, 2007

(86) PCT No.: PCT/EP2007/051775

§ 371 (c)(1),
(2), (4) Date: Nov. 25, 2008

(87) PCT Pub. No.: WO2007/099068

PCT Pub. Date: Sep. 7, 2007

(65) Prior Publication Data

US 2009/0154303 A1 Jun. 18, 2009

(30) Foreign Application Priority Data

Feb. 28, 2006 (EP) .................................... 06004074

(51) Int. Cl.
*G04B 29/00* (2006.01)
*B21D 53/28* (2006.01)
*F16B 9/00* (2006.01)

(52) U.S. Cl. ........ 368/324; 368/124; 29/893.2; 403/242

(58) Field of Classification Search .................... 368/80, 368/124, 127, 60, 161, 168, 169, 172, 322–236; 74/162, 179, 640; 29/893, 893.1, 893.2; 384/125, 215; 403/230, 240, 242
See application file for complete search history.

(56) References Cited

U.S. PATENT DOCUMENTS

| | | | | |
|---|---|---|---|---|
| 3,672,150 | A | 6/1972 | Yasuda et al. | |
| 3,906,714 | A | 9/1975 | Schneider | |
| 3,922,041 | A * | 11/1975 | Quaile et al. | 368/324 |
| 4,358,166 | A * | 11/1982 | Antoine | 384/215 |
| 2002/0114225 | A1 | 8/2002 | Damasko | |
| 2003/0007706 | A1 * | 1/2003 | Suh et al. | 384/125 |
| 2006/0055097 | A1 | 3/2006 | Conus et al. | |

FOREIGN PATENT DOCUMENTS

CH 338146 4/1959

(Continued)

OTHER PUBLICATIONS

International Search Report issued in corresponding application No. PCT/EP2007/051775, completed May 14, 2007 and mailed May 29, 2007.

*Primary Examiner* — Vit Miska
(74) *Attorney, Agent, or Firm* — Griffin & Szipl, P.C.

(57) ABSTRACT

The part is made from a plate (1) made of a brittle material, such as glass, quartz or silicon and includes at least one aperture (2, 4, 6) for driving in a shaft (5). This aperture is characterized in that it includes alternately rigidifying and positioning zones (8) and resilient deformation zones (10). Application to securing a shaft onto the moving parts of a timepiece movement.

18 Claims, 3 Drawing Sheets

FOREIGN PATENT DOCUMENTS

| | | | |
|---|---|---|---|
| EP | 1 331 528 | A2 | 7/2003 |
| EP | 1 445 670 | A1 | 8/2004 |
| FR | 1 447 142 | | 6/1966 |
| FR | 2 500 942 | | 9/1982 |
| GB | 2 094 035 | A | 9/1982 |
| JP | 59-135385 | | 8/1984 |

* cited by examiner

MICRO-MECHANICAL PART WITH A SHAPED APERTURE FOR ASSEMBLY ON A SHAFT

This is a National Phase Application in the United States of International Patent Application No. PCT/EP2007/051775 filed Feb. 23, 2007, which claims priority on European Patent Application No. 06004074.8, filed Feb. 28, 2006. The entire disclosures of the above patent applications are hereby incorporated by reference.

FIELD OF THE INVENTION

The present invention concerns a micro-mechanical part comprising a shaped aperture for facilitating assembly on a shaft for a moving part, or on a stud for a fixed part, and limiting or removing the risk of the part breaking when it is driven onto the shaft or stud, particularly when said part is made of a brittle material.

BACKGROUND OF THE INVENTION

In the field of micro-mechanics, which will hereafter be more specifically illustrated by the field of horology, the driving in technique is very widely used, for example for fixing a wheel onto a shaft. When the material forming the part has a plastic region, which is the case of metals and alloys, the tolerances necessary for the shaft and bore can be calculated so as to obtain a tight fit without any risk of breaking the part, or deforming it. When the material does not have any, or very little, plastic region, which is the case of glass, quartz or silicon, there is a high risk of the part being broken during assembly.

These materials are used more and more frequently in horology, particularly because of their lack of sensitivity to magnetic fields, their very low thermal expansion coefficient and their density, which is much lower than that of metals or alloys. Moreover, modern machining techniques can achieve complex shapes with a high level of precision.

If a push fit is made to prevent stresses in the brittle material, there is then a risk of the part becoming detached or a moving element not being driven by the shaft. In order to overcome this drawback, one could employ the bonding technique that has long been used for securing a balance-spring onto a collet, as disclosed for example in FR Patent No. 1 447 142. U.S. Pat. No. 3,906,714 discloses an embodiment wherein the dot of adhesive both secures the balance-spring to a ring forming the collet and said ring to the balance staff.

The use of an adhesive has, however, the drawback of requiring additional machining steps to provide recesses for the adhesive, and additional step during assembly. Further, the phenomenon of aging can lead to a certain play over time.

In EP Patent No. 1 331 528, which relates to an escapement mechanism pallet for a timepiece movement, for preventing the risk of breakage when the male part of a dart is mounted in the shaped aperture formed in a fork, it is proposed fitting resilient tongues to the aperture. Moreover, in certain embodiments such as that shown in FIG. 30 of the document, the rigid zones of the aperture comprise shoulder surfaces, which position the dart in relation to the fork along a predefined orientation.

The solutions envisaged in this document are not completely satisfactory since they do not enable the male part to be precisely centred in the aperture.

SUMMARY OF THE INVENTION

It is thus an object of the present invention to overcome the drawbacks of the aforecited prior art by providing a micro-mechanical part, in particular a horological part, made of a brittle material that can be assembled by being driven onto a shaft or a stud without any risk of breaking.

The invention therefore concerns a micro-mechanical part made from a plate made of brittle material comprising an aperture into which a shaft or a stud will be driven. A “brittle” material means a material with no plastic deformation region, such as glass, quartz or silicon.

The invention is characterized in that the aperture is a “shaped aperture”, i.e. an aperture not having a perfectly circular contour, said aperture alternatively including rigidifying and positioning zones and resilient deformation zones for gripping or tightening around the shaft. The resilient deformation zones are formed of portions of plate having a recess on either side joining the aperture and the end of which penetrates said aperture. These plate portions have the shape of a tongue that abuts the shaft tangentially when the latter is driven in. The rigidifying and positioning zones and the tongues are arranged alternately around the shaft, each tongue being separated from the adjacent rigidifying zones by a recess, and the rigidifying and positioning zones are distributed in a substantially regular manner around the aperture.

According to other aspects of the invention:

- each rigidifying and positioning zone comprises at least one shoulder provided to come into contact with the shaft, the shoulders are distributed in a substantially regular manner around the aperture in order to centre the shaft in the aperture;
- each rigidifying and positioning zone forms a shoulder, which is delimited by the two recesses framing said rigidifying and positioning zone;
- each tongue describes an overall curve of determined profile, and the two adjacent recesses are formed by two elongated slots of the same general profile as the curve of said tongue;
- the brittle material is selected from among glass, quartz and silicon.

The invention also proposes an arrangement for immobilising a micro-mechanical part comprising an aperture by driving the same onto a support block including a positioning stud. The micro-mechanical part is made with any of the preceding features.

The invention further proposes an arrangement for driving a micro-mechanical part that is mobile in continuous or alternate rotation onto a shaft. The micro-mechanical part is made in accordance with any of the preceding claims.

According to variants of this arrangement:

- the micro-mechanical part forms part of a timepiece movement selected from among an escape wheel, a star wheel, a toothed wheel, a collet, a lever and a pallet;
- the shaft and the aperture also have contours providing an anti-rotational effect;
- the shape of the contour of the shaft and the aperture is oblong or triangular;
- the contact zones of the shaft and the aperture are rough or provided with flutes;
- the micro-mechanical part comprises at least one weld point or one dot of adhesive securing the micro-mechanical part to the shaft.

BRIEF DESCRIPTION OF THE DRAWINGS

Other features and advantages of the present invention will appear in the following description of various embodiments, given by way of non-limiting illustration with reference to the annexed drawings, in which.

DETAILED DESCRIPTION OF THE INVENTION

Figure 1:
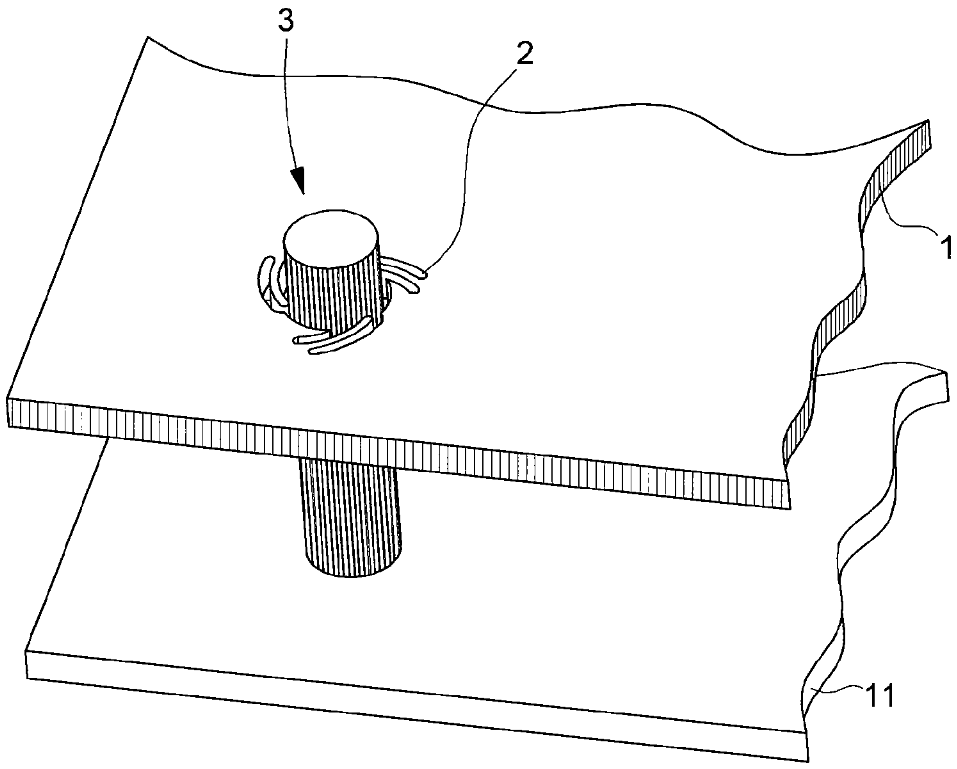
FIG. 1 is a perspective diagram of a first embodiment of an assembly according to the invention.

A first embodiment will be described with reference to FIGS. 1 and 2. FIG. 1 shows a perspective view of a portion of plate 1 that has to be fixed to a support block 11 by means of a cylindrical stud 3 passing through an aperture 2 formed in said plate 1.

Plate 1 is formed of a brittle material, i.e. a material that has no plastic region within normal use temperatures, such as glass, quartz or silicon. Plate 1 can simply form a construction element, for example a bottom plate, a bridge or a dial of a timepiece. It may also have a functional role, carrying a printed circuit board or a Micro-Electro-Mechanical Systems (MEMS) that has to be secured to block 11. In order to avoid breaking the part during a driving-in assembly, aperture 2 is a shaped aperture shown in a larger scale top view in FIG. 2.

Figure 2:
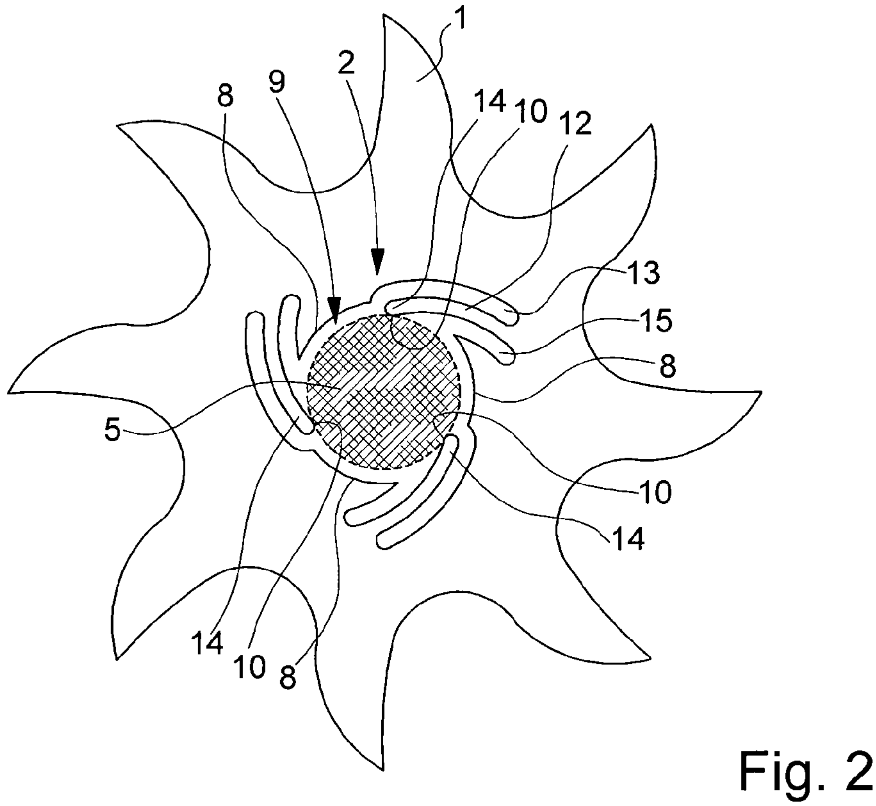
FIG. 2 is a top view of the first embodiment applied to an escape wheel.

FIG. 2 shows by way of example a silicon escape wheel mounted on a cylindrical shaft 5 to be pivoted between two bearings. As can be seen, the contour of aperture 2 does not follow the circular contour of shaft 5 since it exhibits alternately rigidifying and positioning zones 8 and resilient deformation zones 10. It will be noted that rigidifying zones 8 and resilient deformation zones 10 extend in the plane of plate 1, as shown in FIGS. 1 and 2, since they define the shape of aperture 2. Resilient deformation zones 10 will deform in the plane of plate 1.

In order to show that rigidifying zones 8 do not exert any tightening function on shaft 5, the space 9 between said zones 8 and shaft 5 has been greatly exaggerated. Rigidifying zones 8 are used for centring the escape wheel in relation to shaft 5. As can be seen in FIG. 2, rigidifying zones 8 are angularly distributed in a regular manner around aperture 2. There are three rigidifying zones 8 here.

Resilient deformation zones 10 are obtained by making recesses 13, 15 in plate 1, which open into the central aperture and delimit in this example a tongue 12 whose end 14 extends beyond the theoretic contour of shaft 5 and thus performs a tightening or gripping function when shaft 5 is set in place by driving in. FIG. 2 also shows that each tongue 12 is separated from the adjacent rigidifying zones 8 by a recess 13, 15, such that each tongue 12 is connected to plate 1 in a zone distinct from rigidifying zones 8. As shown in FIG. 2, tongues 12 are angular distributed in a regular manner around shaft 5, between rigidifying zones 8. Aperture 2 thus alternately comprises, over its periphery, a rigidifying zone 8 and a tongue 12. As can be seen in FIG. 2, each tongue 12 describes an overall curve of determined profile, here a curve in the arc of a circle. Moreover, the two adjacent recesses 13, 15 are formed by two elongated slots with the same general profile as the curve of said tongue 12.

Figure 5:
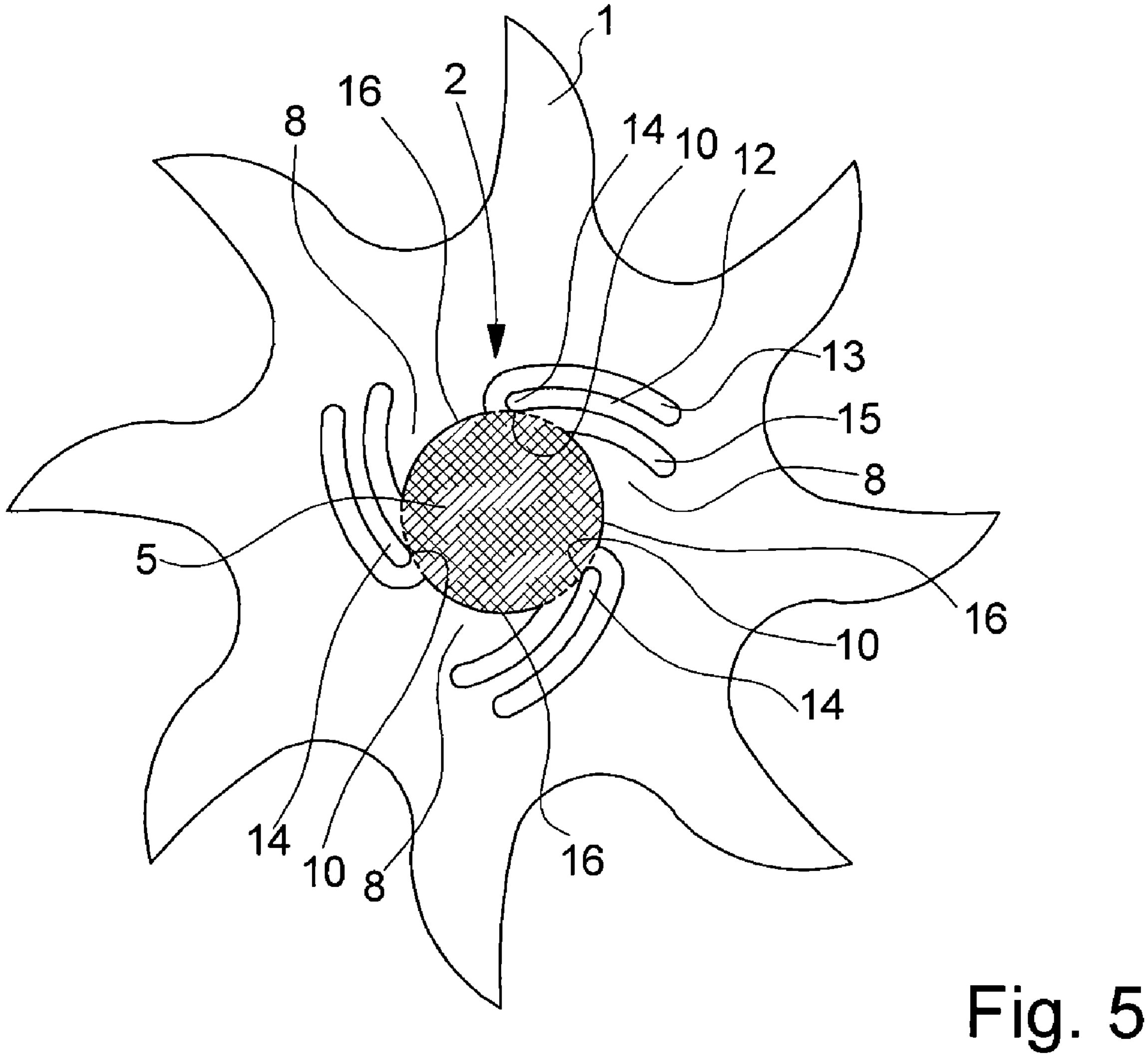
FIG. 5 is a similar view to that of FIG. 2 showing a preferred embodiment of the invention.

FIG. 5 shows a preferred embodiment of the invention similar to that of FIG. 2, in which rigidifying zones 8 are shown as they are in reality, i.e. without exaggerating space 9 between said zones 8 and shaft 5. It will be noted that each rigidifying zone 8 comprises at least one shoulder 16 that will be in contact with the cylindrical wall of shaft 5. These shoulders 16 are distributed in a regular manner around aperture 2 in order to centre shaft 5 in aperture 2. More specifically, each rigidifying zone 8 forms a shoulder 16 that is delimited by the two recesses 13, 15 framing said zone 8. Each rigidifying zone 8 thus has here a profile in the arc of a circle that generally follows the radius of curvature of the cylindrical wall of shaft 5. Shoulders 16 position the wheel precisely in relation to shaft 5. Tongues 12 perform the function of radial tightening, the function of correcting any manufacturing play in the aperture, and they centre shaft 5 in aperture 2.

Of course, the number of rigidifying zones 8 and the number of tongues 12 could be greater than the number shown.

Figure 3:
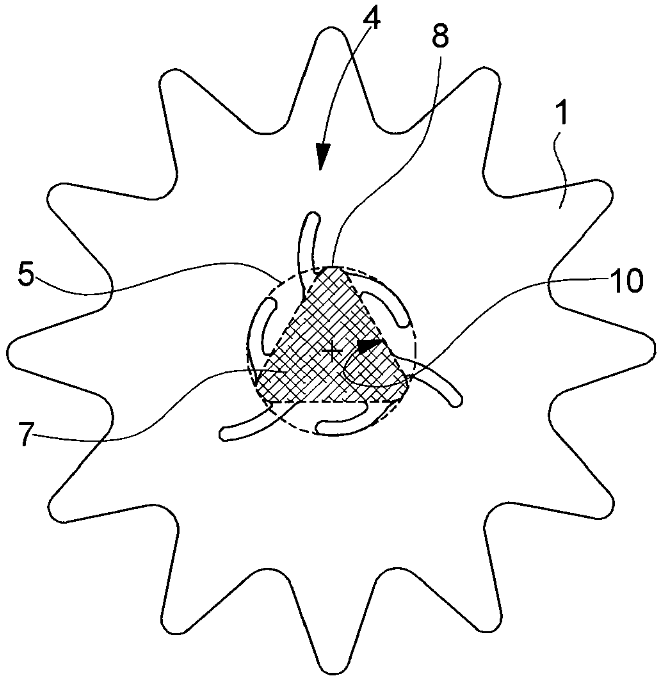
FIG. 3 is a top view, of a second embodiment applied to a star wheel.

FIG. 3 shows a second embodiment with a motion-work star wheel comprising at its centre a shaped aperture 4 providing an anti-rotational effect. Indeed, end 7 of shaft 5 is machined with a non-circular contour in the shape of a triangle with rounded angles. The shaped aperture 4 follows this contour, but, as in the first embodiment, has a succession of rigidifying and positioning zones 8 and resilient deformation zones 10.

Figure 4:
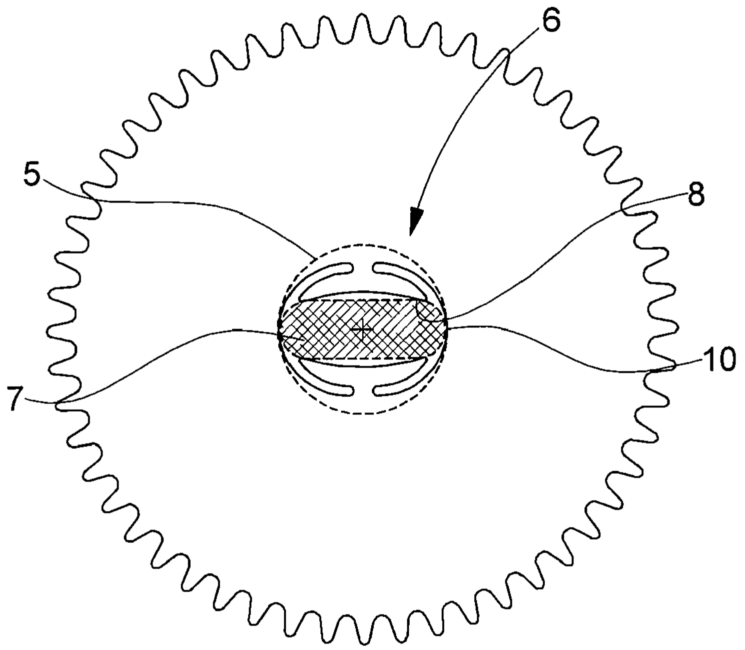
FIG. 4 is a top view of a third embodiment applied to a toothed wheel.

FIG. 4 shows a third embodiment in which the part, made for example of silicon, is a toothed wheel having at the centre thereof a shaped aperture 6, which, as previously, has an "anti-rotational" function. In this example the shaped aperture 7 is oblong.

It is of course possible to imagine any other non-circular contour able to provide an anti-rotational effect, without departing from the scope of the present invention.

It is also possible, in any of the embodiments that have just been described to provide the ends 14 of resilient deformation zones 10 and shaft 5 with surface roughness, for example flutes, to further reduce the risk of the part rotating on the shaft.

The examples given in the preceding description concern parts that rotate continuously, but it is clear that those skilled in the art could adapt the same principle to parts having an alternate movement, such as a lever, a pivoting part, a collet, a pallet or an escape wheel.

Depending upon the application for which the micro-mechanical part is intended, it is possible to finalise assembly of the part on its shaft with a bonding or welding step, which provides a more rigid attachment, if this is necessary. The adhesive or weld completes fixing by the resilient tongues. In such case, fixing by the tongues constitutes an intermediate fixing step guaranteeing precise centring of the shaft in the aperture, with correction of any play, and the bonding or welding step constitutes a final fixing step.

The invention claimed is:

1. A micro-mechanical part, comprising:

a plate made of a brittle material; and at least one aperture formed in the plate enabling insertion of a shaft thereinto, wherein the aperture is a shaped aperture including rigidifying and positioning zones and resilient deformation zones formed arranged for gripping the shaft when inserted, wherein each resilient deformation zone has a first recess on either side joining the aperture and a tongue whose end protrudes tangentially into the aperture, wherein the rigidifying and positioning zones and the tongues are arranged alternately around the shaft when inserted, wherein each tongue is separated from adjacent rigidifying zones by first recesses, and wherein the rigidifying and positioning zones are distributed in a substantially regular manner around the aperture.

2. The micro-mechanical part according to claim 1, wherein each rigidifying and positioning zone includes at least one shoulder that contacts the shaft when inserted, wherein the shoulders are distributed in a substantially regular manner around the aperture in order to center the shaft in the aperture when inserted.

3. The micro-mechanical part according to claim 2, wherein each rigidifying and positioning zone constitutes a shoulder that is delimited by two first recesses framing said rigidifying and positioning zone.

4. The micro-mechanical part according to claim 1, wherein each tongue describes overall a curve of determined profile, and wherein each pair of adjacent first recesses are formed by two elongated slots with the same overall profile as the curve of said tongue.

5. The micro-mechanical part according to claim 1, wherein the brittle material is selected from the group consisting of glass, quartz and silicon.

6. An arrangement for immobilising a micro-mechanical part that includes an aperture by driving said part onto a support block that includes a positioning stud, wherein the micro-mechanical part is the micro-mechanical part according to claim 1.

7. An arrangement for securing a micro-mechanical part that is continuously or alternately mobile in rotation onto a shaft by driving in, wherein the micro-mechanical part is the micro-mechanical part according to claim 1.

8. The arrangement according to claim 7, wherein the micro-mechanical part constitutes a part in a timepiece movement selected from the group consisting of an escape wheel, a star wheel, a toothed wheel, a collet, a lever and a pallet.

9. The arrangement according to claim 7, wherein the shaft and the aperture further have contours providing an anti-rotational effect.

10. The arrangement according to claim 9, wherein the shape of the contour of the shaft and the aperture is oblong or triangular.

11. The arrangement according to claim 9, wherein the contact zones of the shaft and the aperture are provided with surface roughness or flutes.

12. The arrangement according to claim 6, wherein the micro-mechanical part includes at least one weld point or dot of adhesive fixing the micro-mechanical part onto the shaft.

13. The arrangement according to claim 7, wherein the micro-mechanical part includes at least one weld point or dot of adhesive fixing the micro-mechanical part onto the shaft.

14. The micro-mechanical part according to claim 1, wherein the brittle material is glass.

15. The micro-mechanical part according to claim 1, wherein the brittle material is quartz.

16. The micro-mechanical part according to claim 1, wherein the brittle material is silicon.

17. A micro-machining part consisting of:

a plate made of a brittle material; and at least one aperture formed in the plate for enabling a shaft to be driven thereinto, wherein the aperture is a shaped aperture including rigidifying and positioning zones and resilient deformation zones formed in the micro-machining part for gripping the shaft when inserted, wherein each resilient deformation zone is formed by a portion of the plate having a first recess on either side joining the aperture and having a tongue-shape an end of which protrudes tangentially into the aperture, wherein the rigidifying and positioning zones and the tongues are arranged alternately around the shaft when the shaft is inserted and the micro-machining part is gripping the shaft, wherein each tongue is separated from adjacent rigidifying zones by first recesses, and wherein the rigidifying and positioning zones are distributed in a substantially regular manner around the aperture.

18. A micro-machining part made from a first plate made of a brittle material, wherein the micro-machining part includes:

at least one aperture formed therein for driving engagement with a shaft, wherein the aperture is a shaped aperture formed by rigidifying and positioning means and resilient deformation means formed in the micro-machining part for gripping the shaft, wherein each resilient deformation means is formed by a portion of the plate having a first recess on either side joining the aperture and having the shape of a tongue, the end of which protrudes tangentially into the aperture, wherein the rigidifying and positioning means and the tongues are arranged alternately around the shaft, wherein each tongue is separated from adjacent rigidifying and positioning means by first recesses, and wherein the rigidifying and positioning means are distributed in a substantially regular manner around the aperture.

* * * * *